(12) United States Patent (10) Patent No.: US 9,197,574 B2
Morris (45) Date of Patent: Nov. 24, 2015

(54) DISTRIBUTED SEQUENCE NUMBER CHECKING FOR NETWORK TESTING

(71) Applicant: Spirent Communications, Inc., Sunnyvale, CA (US)

(72) Inventor: John Morris, Simi Valley, CA (US)

(73) Assignee: Spirent Communications, Inc., Sunnyvale, CA (US)

( * ) Notice: Subject to any disclaimer, the term of this patent is extended or adjusted under 35 U.S.C. 154(b) by 113 days.

(21) Appl. No.: 13/875,195

(22) Filed: May 1, 2013

(65) Prior Publication Data

US 2014/0328349 A1 Nov. 6, 2014

(51) Int. Cl.
*H04L 12/801* (2013.01)
*H04L 12/26* (2006.01)
*H04J 3/00* (2006.01)
*H04J 99/00* (2009.01)

(52) U.S. Cl.
CPC ............... *H04L 47/34* (2013.01); *H04L 12/26* (2013.01); *H04J 3/00* (2013.01); *H04J 15/00* (2013.01)

(58) Field of Classification Search
None
See application file for complete search history.

(56) References Cited

U.S. PATENT DOCUMENTS

| 2006/0187955 A1* | 8/2006 | Rezaiifar et al. ............... 370/464 |
| 2007/0147234 A1* | 6/2007 | Walter et al. .................. 370/229 |
| 2009/0235137 A1* | 9/2009 | Umesh et al. ................. 714/748 |

* cited by examiner

*Primary Examiner* — Kodzovi Acolatse
(74) *Attorney, Agent, or Firm* — Yiding Wu; Haynes Beffel & Wolfeld LLP

(57) ABSTRACT

A method of line speed sequence number checking of frames includes, in a first process, using a lowest order bit of a sequence number of a frame to assign the frame to an odd or even second process, and dispatching at least the sequence number for processing by the assigned second process. The method includes, in the first process, flagging as a first sequence error type occurrences of assigning consecutively processed frames to the same second process. The method includes, in the second processes, checking the sequence number of an incoming frame, flagging as a second sequence error type non-consecutive sequence numbers in consecutively processed incoming frames, and dispatching the frame for additional downstream processing. The method is applicable to a hierarchy of processes, and to multiplexed flows. The method can use a modulo N of the sequence number to assign the frame to one of N processes.

6 Claims, 5 Drawing Sheets

DISTRIBUTED SEQUENCE NUMBER CHECKING FOR NETWORK TESTING

BACKGROUND

The technology disclosed relates to tracking and analyzing internet traffic flows. In particular, it relates to line speed checking of sequence numbers of frames in internet traffic flows.

When testing networks or network equipment, test frames in thousands of flows can be generated, passed through the networks or network equipment under test, and analyzed after they pass through the networks or network equipment under test. Information about each of the flows, such as the total number of frames received, the total bytes in each frame, and whether the expected frames are received in the expected order, is accumulated and analyzed. For checking against loss of frames, duplication of frames, and frames that are out of order, each frame carries within it a sequence number. When the frames are generated for test purposes, the sequence number in each frame in a flow is one greater than the sequence number of the immediately preceding frame in the same flow. When the frames are analyzed, the sequence numbers are checked to see if they are consecutive for each flow.

As network speeds have increased, it has become more difficult for a single processer, such as an FPGA (Field Programmable Gate Array) or a CPU (Central Processing Unit), to keep up with the traffic flow and perform necessary calculations on each frame. An approach to solve this problem is to split a fast traffic flow between multiple processes, where one or more processes can be implemented in one or more processors such as FPGAs or CPUs. This splitting approach works for certain statistics, such as the total number of frames received in a flow, and the total bytes in each frame.

However, detection of sequence errors (missing frames, duplicated frames, and out of order frames) requires each frame to be compared with its predecessor in the same flow, but in the splitting approach, two processes between which a fast traffic flow is split do not know about the relationship between a frame and its preceding frame.

An opportunity arises to provide a method of line speed sequence number checking of frames at increased network speeds that require splitting fast flows into slower flows for network testing.

SUMMARY

One implementation of the technology disclosed teaches a method of line speed sequence number checking of frames includes, in a first process, using a lowest order bit of a frame sequence number of a frame to assign the frame to an odd or even second process and dispatching at least the frame sequence number for processing by the assigned second process. The method includes, in the first process, flagging as a first sequence error type occurrences of assigning consecutively processed frames to the same odd or even second process. The method includes, in the odd and even second processes, checking the frame sequence number of an incoming frame, flagging as a second sequence error type non-consecutive frame sequence numbers in consecutively processed incoming frames, and dispatching the frame for additional downstream processing.

The method can include, in a hierarchy of tiers of processes, where tier T in the tiers includes $2^{(T-1)}$ processes, Tier 1 includes the first process, and Tier 2 includes the odd and even second processes, using a particular bit of a frame sequence number of an incoming frame to a process in Tier T to assign the incoming frame to one of $2^T$ processes in Tier (T+1). The method includes, in the processes in Tier (T+1), checking the frame sequence number of the incoming frame, flagging as a third sequence error type frame sequence numbers of two consecutively processed incoming frames differing by a value other than two (2) to the power of (T−1), and dispatching the frame for additional downstream processing.

Another implementation teaches a method that includes, in a first process, using a modulo N of a frame sequence number to assign the frame to a process in N processes and dispatching at least the frame sequence number for processing by the process in the N processes. The method then includes flagging sequence errors in the first process and the N processes.

Another implementation teaches a method that includes, for multiplexed flows, in a first process, using a lowest order bit of a frame sequence number of a frame and a lowest order bit of a flow number of the frame to assign the frame to one of two second processes and dispatching at least the frame sequence number and the flow number for processing by the assigned second process. The method then includes flagging sequence errors in the first process and in the second processes.

DETAILED DESCRIPTION

The following detailed description is made with reference to the figures. Examples are described to illustrate the present technology, not to limit its scope, which is defined by the claims. Those of ordinary skill in the art will recognize a variety of equivalent variations on the description that follows.

Figure 1:
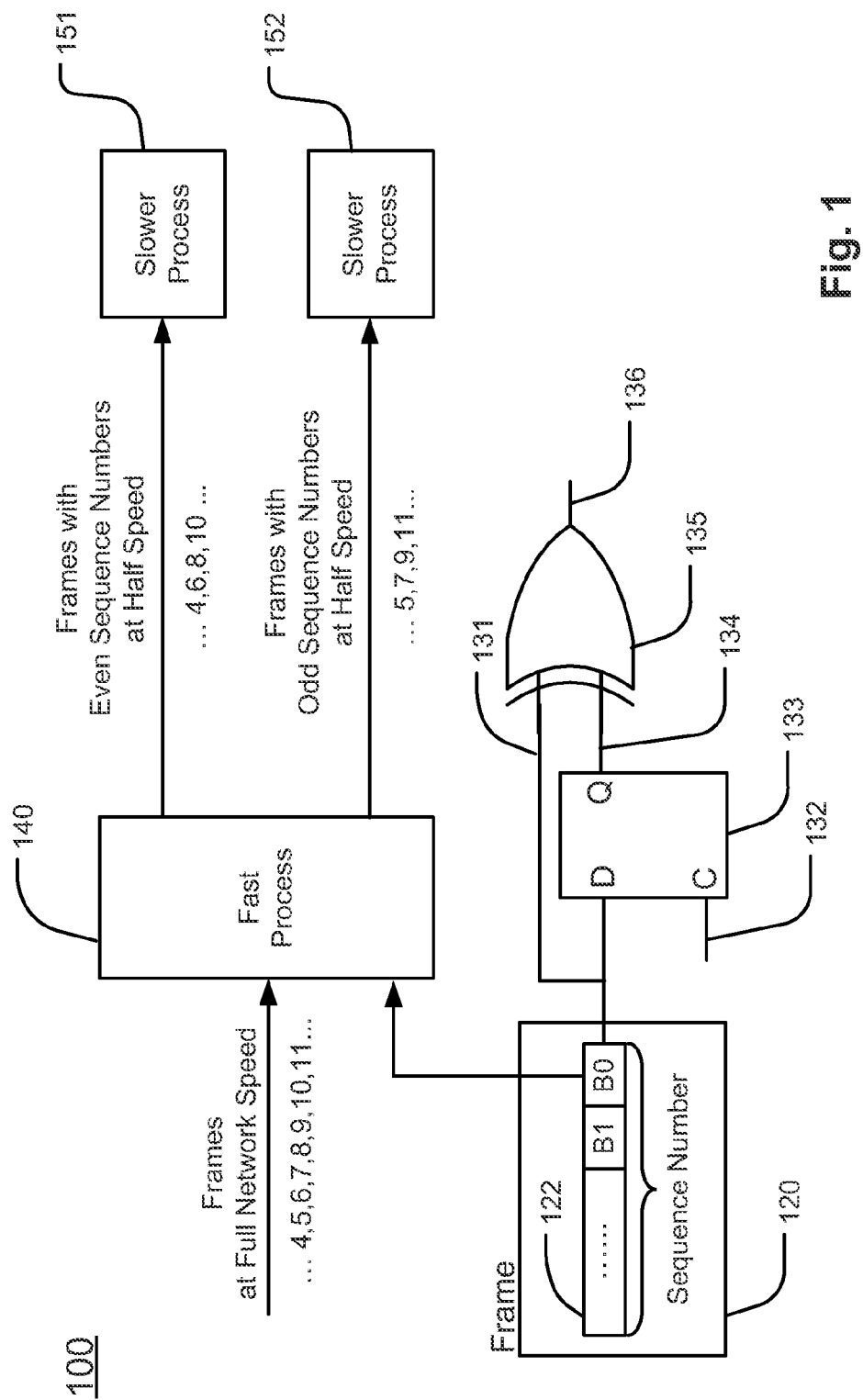
FIG. 1 is a block diagram of an example computing system including two slower processes in which line speed sequence number checking of frames in a flow can be performed.

FIG. 1 is a block diagram of an example computing system including two slower processes in which line speed sequence number checking of frames in a single flow can be performed. The system 100 includes a fast process 140, a slower second process 151, and a slower second process 152. The fast process 140 processes incoming frames of the flow, while the two second processes process subsets of the incoming frames of the flow from the fast process 140. The two slower processes 151 and 152 may not be implemented in a same processor, such as an FPGA (Field Programmable Gate Array), as the fast process 140, because a single processor may not have the resources needed to count required statistics at full network speed. The two slower processes 151 and 152 can be implemented in additional processors such as FPGAs or CPUs (Central Processing Units) over which the workload for network testing is spread and balanced.

The present technology provides a method of line speed sequence number checking of frames. In one implementation, the method includes, in a first process (e.g. 140), using a lowest order bit (e.g. B0) of a frame sequence number (e.g. 122) of a frame (e.g. 120) to assign the frame to an odd or even second process (e.g. 152 or 151), and dispatching at least the frame sequence number for processing by the assigned second process. Other fields in the frame can also be dispatched to the assigned second process as needed for calculation of required statistics for the subset of frames dispatched to the assigned second process. In the example shown in FIG. 1, frames with even sequence numbers are dispatched to an even second process (e.g. 151), while frames with odd sequence numbers are dispatched to an odd second process (e.g. 152). The fast process 140 can receive and process frames at full network speed, while the slower processors 151 and 152 can receive and process subsets of the frames at half the full network speed.

When there are no errors in network traffic, frame sequence numbers of consecutively processed incoming frames can be 0, 1, 2, 3, 4, 5, 6, 7, etc. Accordingly, in the first process, the even second process is dispatched 0, 2, 4, 6, etc, and the odd second process is dispatched 1, 3, 5, etc, where frame sequence numbers of two consecutively processed incoming frames differ by 2.

An "out of order frame" sequence error can occur when frames are transmitted out of order such that frame sequence numbers of consecutively processed incoming frames become, for example, 0, 1, 2, 4, 3, 5, 6, 7, etc, where frames with frame sequence numbers of 3 and 4 are swapped. Accordingly, in the first process, the even second process is dispatched 0, 2, 4, 6, etc, and the odd second process is dispatched 1, 3, 5, etc. The dispatched frame sequence numbers are the same as without the "out of order frame" sequence errors, thus the odd or even second process cannot detect the "out of order frame" sequence error.

The method includes, in the first process (e.g. 140), further flagging as a first sequence error type (i.e. "out of order frame" sequence error) occurrences of assigning consecutively processed frames to the same odd or even second process. As described above, when an "out of order frame" sequence error occurs, frame sequence numbers of consecutively processed incoming frames become, for example, 0, 1, 2, 4, 3, 5, 6, 7, etc, where the first process can detect that two consecutively processed frames both have even frame sequence numbers (e.g. 2 and 4), and two other consecutively processed frames both have odd frame sequence numbers (e.g. 3 and 5).

In one implementation, as illustrated in FIG. 1, the "out of order frame" sequence error can be detected in the first process by storing a lowest order bit of a frame sequence number of a previous frame (e.g. 134) and then comparing a lowest order bit of a frame sequence number of a current frame (e.g. 131) with the stored lowest order bit (e.g. 134). For example, a memory element 133 receives a lowest order bit (e.g. B0) of a frame sequence number (e.g. 122) of a frame (e.g. 120) at its input D, stores the lowest order bit on an event at its clock C, and provides the stored lowest order bit at its output Q. A logic element, such as an exclusive-or (XOR) gate 135, compares the stored lowest order bit (e.g. 134) of the frame sequence number of the previous frame with the lowest order bit (e.g. 131) of the frame sequence number of the current frame to determine if the lowest order bits of two consecutive frame sequence numbers from a same flow alternate between odd and even. If the two lowest order bits are both odd or both even, output 136 of the XOR gate 135 provides a logic value of 0 to indicate an error, otherwise a logic value of 1 to indicate no error.

A "lost frame" sequence error can occur when a frame is lost such that frame sequence numbers of consecutively processed incoming frames become, for example, 0, 1, 2, 3, 5, 6, 7, etc, where a frame with frame sequence number of 4 is lost. Accordingly, in the first process, the even second process is dispatched 0, 2, 6, 8, etc, where the frame with frame sequence number of 4 is missing, and thus frame sequence numbers of 2 and 6 differ by 4, a value other than 2 when no error occurs.

A "duplicated frame" sequence error can occur when a frame is duplicated such that frame sequence numbers of consecutively processed incoming frames become for example, 0, 1, 2, 3, 3, 4, 5, 6, 7, etc, where a frame with frame sequence number of 3 is duplicated. Accordingly, in the first process, the odd second process is dispatched 1, 3, 3, 5, 7, etc, where the frame with frame sequence number of 3 is duplicated, and thus frame sequence numbers of 3 and 3 differ by 0, a value other than 2 when no error occurs.

Consequently, both the "lost frame" sequence error and the "duplicated frame" sequence error result in non-consecutive frame sequence numbers in consecutively processed incoming frames to the odd and even second processes.

The method further includes, in the odd and even second processes, checking the frame sequence number of an incoming frame, flagging as a second sequence error type (i.e. "duplicated frame" sequence error or "lost frame" sequence error) non-consecutive frame sequence numbers in consecutively processed incoming frames, and dispatching the frame for additional downstream processing. For example, in the odd and even second processes, consecutively processed incoming frames can be checked to determine if their frame sequence numbers differ by 2, and if not, flag the second sequence error type.

Figure 2:
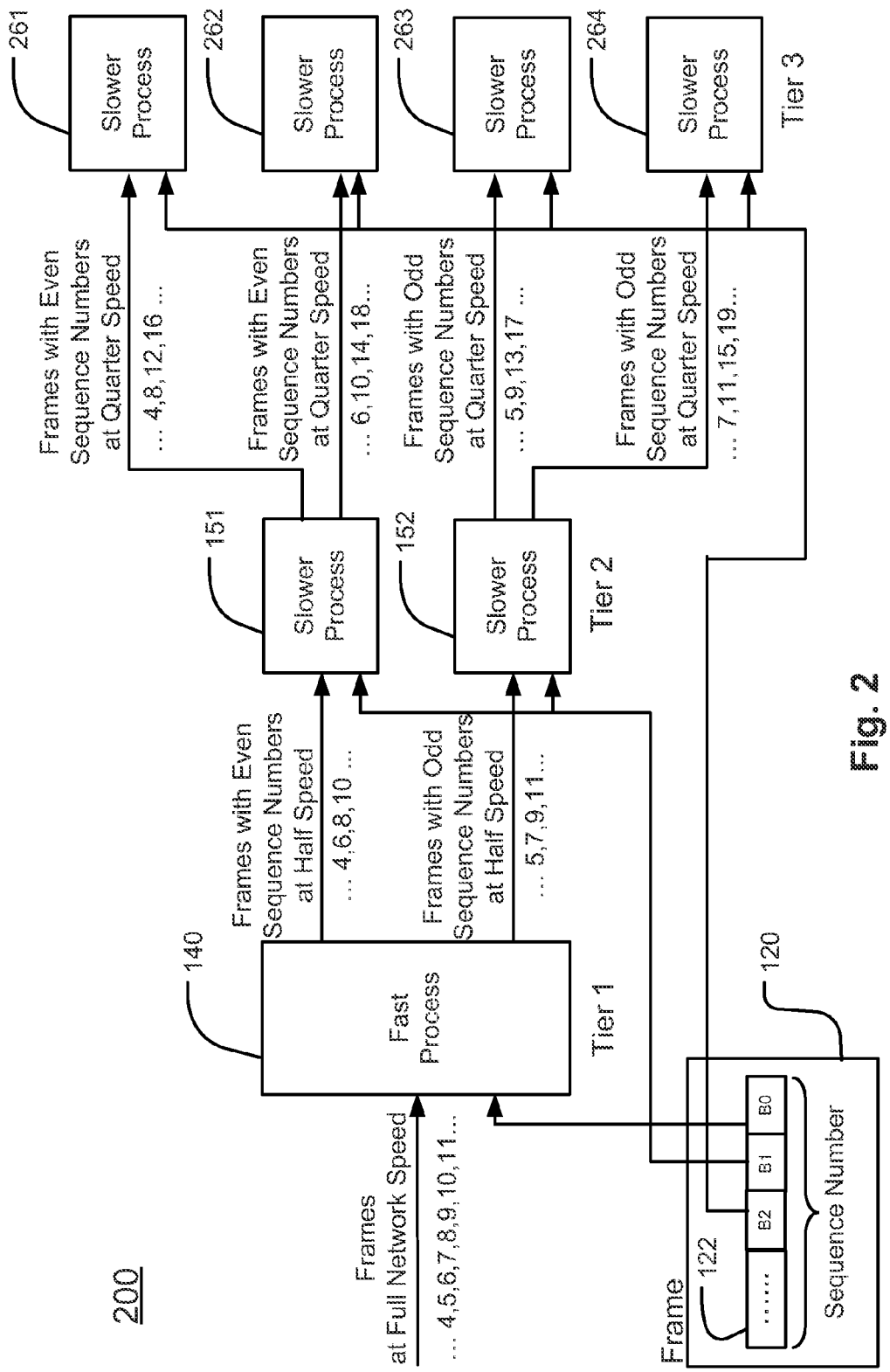
FIG. 2 is a block diagram of an example computing system including a hierarchy of slower processes in which line speed sequence number checking of frames in a flow can be performed.

FIG. 2 is a block diagram of an example computing system including a hierarchy of tiers of slower processes in which line speed sequence number checking of frames in a flow can be performed. Description about FIG. 1 is generally applicable to FIG. 2. The difference between FIG. 1 and FIG. 2 includes a hierarchy of processes.

In the hierarchy of tiers of processes, a tier T in the tiers includes $2^{(T-1)}$ processes, Tier 1 includes the first process (e.g. 140), and Tier 2 includes the odd and even second processes (e.g. 151 and 152). The method further includes, in the hierarchy of tiers of processes, using a particular bit of a frame sequence number of an incoming frame to a process in Tier T to assign the incoming frame to one of $2^T$ processes in Tier (T+1).

FIG. 2 illustrates a Tier 1 includes fast process 140, a Tier 2 includes slower processes 151 and 152, and a Tier 3 includes slower processes 261-264. For Tier 1 (T=1), a particular bit B0 of a frame sequence number of an incoming frame to the fast process 140 is used to assign the incoming frame to one of two processes in Tier 2 (i.e. 151 and 152). For Tier 2 (T=2), a particular bit B1 of a frame sequence number of an incoming frame to a process in Tier 2 (e.g. 151 or 152) is used to assign the incoming frame to one of four processes in Tier 3 (i.e. 261-264).

The method includes, in the processes in Tier (T+1), checking the frame sequence number of the incoming frame, flagging as a third sequence error type frame sequence numbers of two consecutively processed incoming frames differing by a value other than two (2) to the power of (T−1), and dispatching the frame for additional downstream processing. For example, in the processes in Tier 3, consecutively processed incoming frames can be checked to determine if their frame sequence numbers differ by 4, and if not, flag the third sequence error type.

In slower processes, such as slower processes in Tier 2, Tier 3, etc, tasks for which the fast process does not have sufficient resources can be performed, such as calculating statistics, making analysis, and checking for other types of errors.

Figure 3:
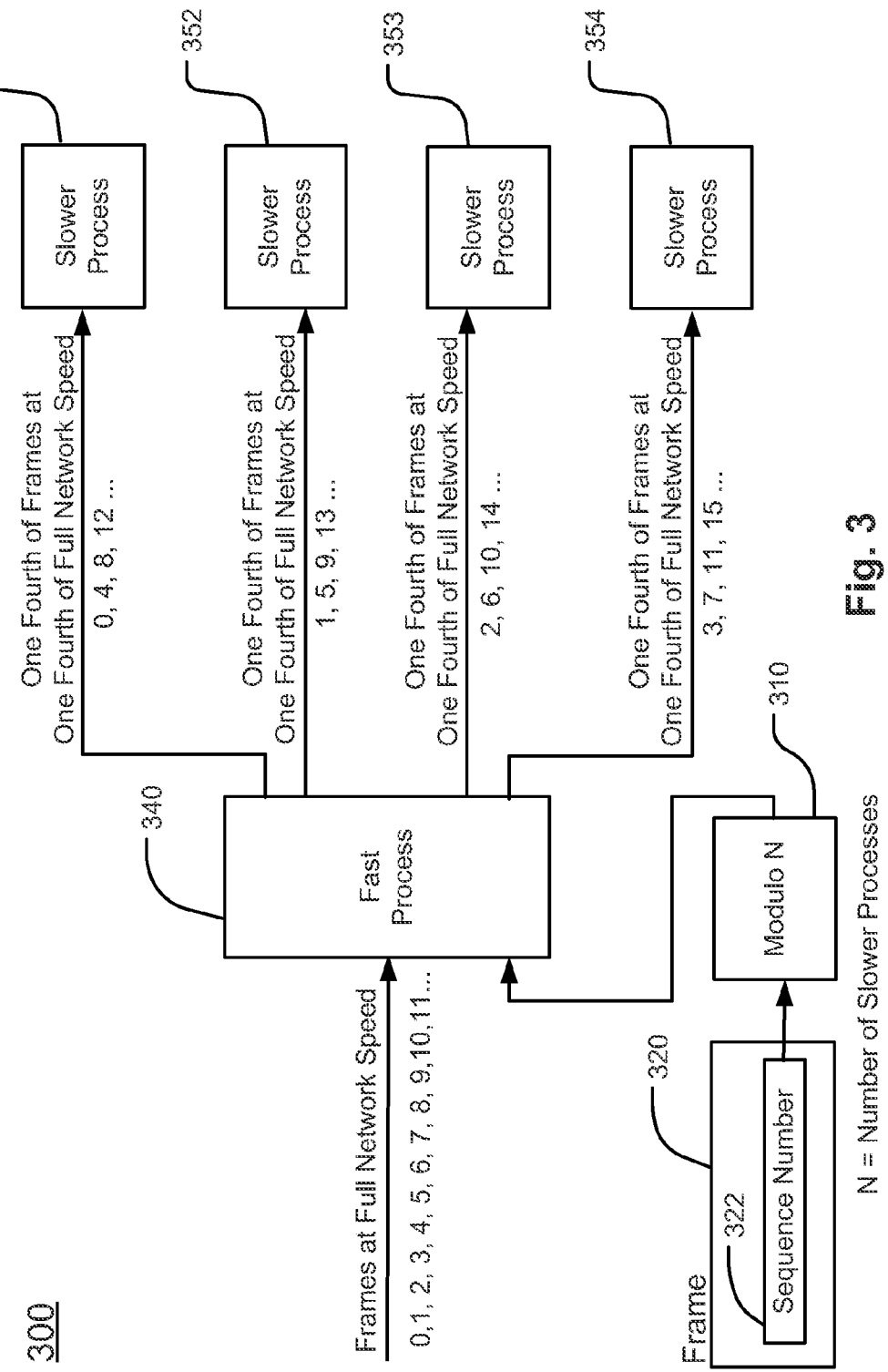
FIG. 3 is a block diagram of an example computing system including a number of slower processes in which line speed sequence number checking of frames in a flow can be performed, where the number is a power of two.

FIG. 3 is a block diagram of an example computing system including a number of slower processes in which line speed sequence number checking of frames in a flow can be performed, where the number is a power of two, such as 2, 4, 8, 16, etc. The system 300 includes a fast process 340, and N slower processes (e.g. 351-354), where N is the divisor for a modulo operation of a frame sequence number of a frame. Modulo N of the frame sequence number is used to assign the frame to a slower process in the N slower process. In the example shown in FIG. 3, N is 4. The fast process 340 processes incoming frames of the flow, while the N processes process subsets of the incoming frames of the flow from the fast process 340. The N slower processes 351 through 354 may not be implemented in a same processor as the fast process 340 (e.g. an FPGA), because a single processor may not have the resources needed to count required statistics at full network speed. The N slower processes 351 through 354 can be implemented in additional processors such as FPGAs or CPUs (Central Processing Units) over which the workload for network testing is spread and balanced.

In one implementation, the method of line speed sequence number checking of frames includes, in a first process (e.g. 340), using a modulo N (e.g. 310) of a frame sequence number (e.g. 322) of a frame (e.g. 320) to assign the frame to a slower process in the N slower processes (e.g. 351-354), and dispatching at least the frame sequence number for processing by the assigned slower process in the N slower processes. Other fields in the frame can also be dispatched to the assigned slower process as needed for calculation of required statistics for the subset of frames dispatched to the assigned slower process. In general, the fast process 340 can receive and process frames at full network speed, and dispatch the frames to N slower processors, while the slower processors can receive and process subsets of the frames at one Nth of the full network speed. In the example shown in FIG. 3, where N=4, the fast process 340 can receive and process frames at full network speed, and dispatch the frames to four slower processors, while the slower processors can receive and process subsets of the frames at one fourth of the full network speed.

When there are no errors in network traffic, frame sequence numbers of consecutively processed incoming frames can be, for example, 0, 1, 2, 3, 4, 5, 6, 7, etc. Accordingly, in the example shown in FIG. 3, where N=4, frame sequence numbers 0, 4, 8, 12 are dispatched to a first slower process 351, frame sequence numbers 1, 5, 9, 13 are dispatched to a second slower process 352, frame sequence numbers 2, 6, 10, 14 are dispatched to a third slower process 353, and frame sequence numbers 3, 7, 11, 15 are dispatched to a fourth slower process 354. In general, frame sequence numbers of two consecutively processed incoming frames to a slower process differ by N, which is the divisor in the modulo operation of a frame sequence number, and is the number of slower processes. As illustrated in FIG. 3, where N=4, frame sequence numbers differ by 4 as received by each slower process, when no error occurs.

An "out of order frame" sequence error can occur when frames are transmitted out of order such that frame sequence numbers of consecutively processed incoming frames become, for example, 0, 1, 5, 3, 4, 2, 6, 7, etc, where frames with frame sequence numbers of 2 and 5 are swapped. Accordingly, in the first process (e.g. 340), the second slower process 352 is dispatched frame sequence numbers of 1, 5, 9, 13 and the third slower process 353 is dispatched frame sequence numbers of 2, 6, 10, 14. The dispatched frame sequence numbers are the same as without the "out of order frame" sequence errors, thus the slower processes cannot detect the "out of order frame" sequence error.

The method includes, in the first process (e.g. 340), further flagging as a first sequence error type (i.e. "out of order frame" sequence error) occurrences of assigning consecutively processed frames to the same process in the N processes. As described above, when an "out of order frame" sequence error occurs, frame sequence numbers of consecutively processed incoming frames become, for example, 0, 1, 5, 3, 4, 2, 6, 7, etc. The first process can detect that two consecutively processed frames have frame sequence numbers (e.g. 1 and 5) with the same modulo 4 value of 1, and also that another two consecutively processed frames have frame sequence numbers (e.g. 2 and 6) with the same modulo 4 value of 2, and then flag the first sequence error type accordingly.

In one implementation using a modulo N (e.g. 310) of a frame sequence number (e.g. 322) of a frame (e.g. 320) to assign the frame to a process in N slower processes, the "out of order frame" sequence error can be detected in the first process (e.g. 340) by storing a modulo value of a frame sequence number of a previous frame, and then comparing a modulo value of a frame sequence number of a current frame with the stored modulo value.

A "lost frame" sequence error can occur when a frame is lost such that frame sequence numbers of consecutively processed incoming frames become, for example, 0, 1, 2, 3, 5, 6, 7, etc, where a frame with frame sequence number of 4 is lost. Accordingly, in the first process, the first slower process 351 is dispatched frame sequence numbers of 0, 8, 12, etc, where the frame with frame sequence number of 4 is missing, and thus frame sequence numbers of 0 and 8 differ by 8, a value other than 4 when no error occurs.

A "duplicated frame" sequence error can occur when a frame is duplicated such that frame sequence numbers of consecutively processed incoming frames become, for example, 0, 1, 2, 3, 3, 4, 5, 6, 7, etc, where a frame with frame sequence number of 3 is duplicated. Accordingly, in the first process, the fourth slower process (e.g. 354) is dispatched frame sequence numbers of 3, 3, 7, 11, 15, etc, where the frame with frame sequence number of 3 is duplicated, and thus frame sequence numbers of 3 and 3 differ by 0, a value other than 4 when no error occurs.

Consequently, both the "lost frame" sequence error and the "duplicated frame" sequence error result in frame sequence numbers of two consecutively processed incoming frames differing by a value other than N, where N is the number of slower processes or the divisor for the modulo operation. In the example of the "lost frame" sequence error, frame sequence numbers of two consecutively processed incoming frames differ by 8 between frame sequence numbers of 0 and 8, while the expected difference is N=4. In the example of the "duplicated frame" sequence error", frame sequence numbers of two consecutively processed incoming frames differ by 0 between frame sequence numbers of 3 and 3, while the expected difference is N=4.

The method further includes, in the N processes, checking the frame sequence number of an incoming frame, flagging as a second sequence error type (i.e. "duplicated frame" sequence error or "lost frame" sequence error) frame sequence numbers of two consecutively processed incoming frames differing by a value other than N, and dispatching the frame for additional downstream processing.

Figure 4:
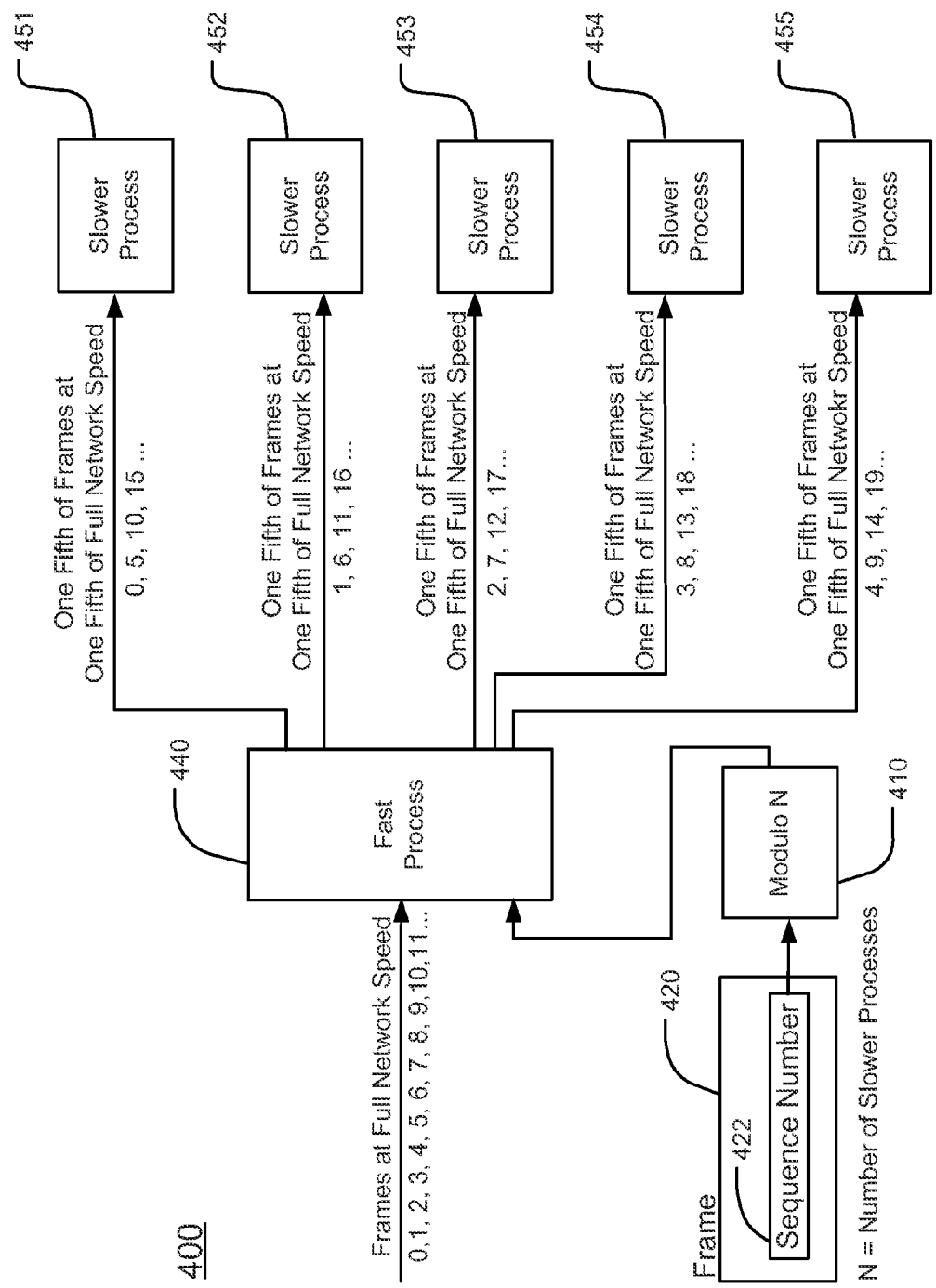
FIG. 4 is a block diagram of another example computing system including a number of slower processes in which line speed sequence number checking of frames in a flow can be performed, where the number is other than a power of two.

FIG. 4 is a block diagram of another example computing system including a number of slower processes in which line speed sequence number checking of frames in a flow can be performed, where the number is other than a power of two. Description of FIG. 3 is generally applicable to FIG. 4. FIG. 4 illustrates that the number of slower processes, which is the divisor for the modulo operation, is not limited to a power of two, such as 2, 4, 8, 16, etc.

The system 400 includes a fast process 440, and N slower processes (e.g. 451-455), where N is the divisor for a modulo operation of a frame sequence number of a frame. Modulo N of the frame sequence number is used to assign the frame to a slower process in the N slower processes. In the example shown in FIG. 4, N is 5.

In one implementation, the method of line speed sequence number checking of frames includes, in a first process (e.g. 440), using a modulo N (e.g. 410) of a frame sequence number (e.g. 422) of a frame (e.g. 420) to assign the frame to a process in N slower processes (e.g. 451-455), and dispatching at least the frame sequence number for processing by the assigned slower process in the N slower processes. In the example shown in FIG. 4, where N=5, the fast process 440 can receive and process frames at full network speed, and dispatch the frames to five slower processors, while the slower processors can receive and process subsets of the frames at one fifth of the full network speed.

When there are no errors in network traffic, frame sequence numbers of consecutively processed incoming frames can be, for example, 0, 1, 2, 3, 4, 5, 6, 7, etc. Accordingly, in the example shown in FIG. 4, where N=5, frame sequence numbers 0, 5, 10, 15 are dispatched to a first slower process 451, frame sequence numbers 1, 6, 11, 16 are dispatched to a second slower process 452, frame sequence numbers 2, 7, 12, 17 are dispatched to a third slower process 453, frame sequence numbers 3, 8, 13, 18 are dispatched to a fourth slower process 454, and frame sequence numbers 4, 9, 14, 19 are dispatched to a fifth slower process 455. In general, frame sequence numbers of two consecutively processed incoming frames to a slower process differ by N, which is the divisor in the modulo operation of a frame sequence number, and is the number of slower processes. As illustrated in FIG. 4, where N=5, frame sequence numbers differ by 5 as received by each slower process, when no error occurs.

An "out of order frame" sequence error can occur when frames are transmitted out of order such that frame sequence numbers of consecutively processed incoming frames become, for example, 0, 5, 2, 3, 4, 1, 6, 7, etc, where frames with frame sequence numbers of 2 and 5 are swapped. Accordingly, in the first process (e.g. 440), the first slower process 451 is dispatched frame sequence numbers of 0, 5, 10, 15 and the second slower process 452 is dispatched frame sequence numbers of 1, 6, 11, 16. The dispatched frame sequence numbers are the same as without the "out of order frame" sequence errors, thus the slower processes cannot detect the "out of order frame" sequence error.

The method includes, in the first process (e.g. 440), further flagging as a first sequence error type (i.e. "out of order frame" sequence error) occurrences of assigning consecutively processed frames to the same process in the N processes. As described above, when an "out of order frame" sequence error occurs, frame sequence numbers of consecutively processed incoming frames become, for example, 0, 5, 2, 3, 4, 1, 6, 7, etc. The first process can detect that two consecutively processed frames have frame sequence numbers (e.g. 0 and 5) with the same modulo 5 value of 0, and also that another two consecutively processed frames have frame sequence numbers (e.g. 1 and 6) with the same modulo 5 value of 1, and then flag the first sequence error type accordingly.

In one implementation using a modulo N (e.g. 410) of a frame sequence number (e.g. 422) of a frame (e.g. 420) to assign the frame to a process in N slower processes, the "out of order frame" sequence error can be detected in the first process (e.g. 440) by storing a modulo N value of a frame sequence number of a previous frame, and then comparing a modulo N value of a frame sequence number of a current frame with the stored modulo value.

A "lost frame" sequence error can occur when a frame is lost such that frame sequence numbers of consecutively processed incoming frames become, for example, 0, 1, 2, 3, 4, 6, 7, etc, where a frame with frame sequence number of 5 is lost. Accordingly, in the first process, the first slower process 451 is dispatched frame sequence numbers of 0, 10, 15, etc, where the frame with frame sequence number of 5 is missing, and thus frame sequence numbers of 0 and 10 differ by 10, a value other than 5 when no error occurs.

A "duplicated frame" sequence error can occur when a frame is duplicated such that frame sequence numbers of consecutively processed incoming frames become, for example, 0, 1, 2, 3, 3, 4, 5, 6, 7, etc, where a frame with frame sequence number of 3 is duplicated. Accordingly, in the first process, the fourth slower process (e.g. 454) is dispatched frame sequence numbers of 3, 3, 8, 13, 18, etc, where the frame with frame sequence number of 3 is duplicated, and thus frame sequence numbers of 3 and 3 differ by 0, a value other than 5 when no error occurs.

Consequently, both the "lost frame" sequence error and the "duplicated frame" sequence error result in frame sequence numbers of two consecutively processed incoming frames differing by a value other than N, where N is the number of slower processes or the divisor for the modulo operation. In the example of the "lost frame" sequence error, frame sequence numbers of two consecutively processed incoming frames differ by 10 between frame sequence numbers of 0 and 10, while the expected difference is N=5. In the example of the "duplicated frame" sequence error", frame sequence numbers of two consecutively processed incoming frames differ by 0 between frame sequence numbers of 3 and 3, while the expected difference is N=5.

The method further includes, in the N processes, checking the frame sequence number of an incoming frame, flagging as a second sequence error type (i.e. "duplicated frame" sequence error or "lost frame" sequence error) frame sequence numbers of two consecutively processed incoming frames differing by a value other than N, and dispatching the frame for additional downstream processing.

Figure 5:
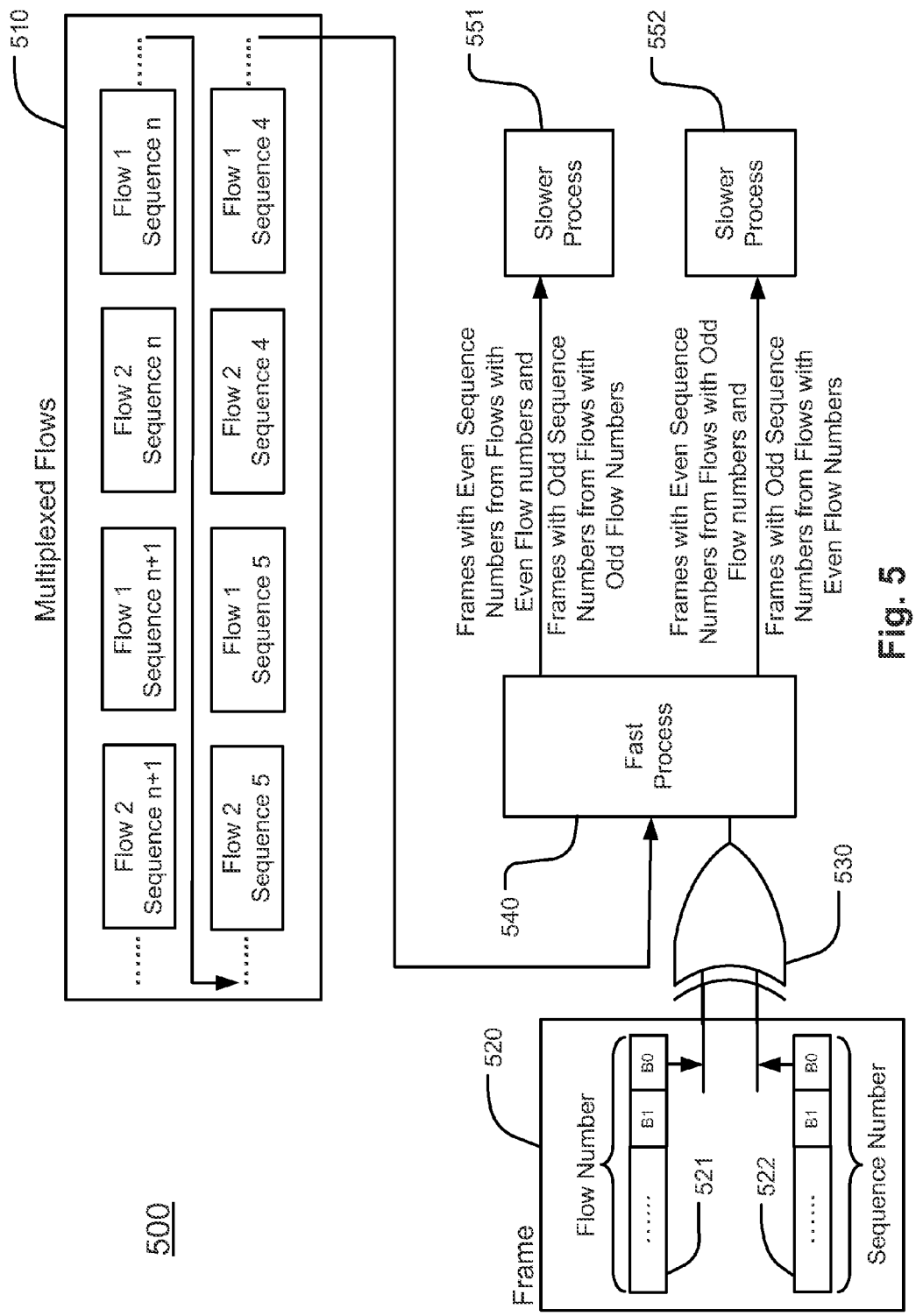
FIG. 5 is a block diagram of an example computing system in which line speed sequence number checking of frames in multiplexed flows can be performed.

FIG. 5 is a block diagram of an example computing system in which line speed sequence number checking of frames in multiplexed flows can be performed. The system 500 includes a fast process 540, a slower second process 551, and a slower second process 552. The fast process 540 processes incoming frames of multiplexed flows at full network speed, while the two second processes process subsets of the incoming frames of the multiplexed flows from the fast process 540 at a fraction of the full network speed. Each of the multiplexed flows has its own consecutive frame sequence numbers. Each frame in each of the multiplexed flows includes a flow number and a frame sequence number.

As described in connection with FIG. 1, frames from a single flow is distributed to two slower processes, such that the workload for network testing is spread and balanced between one of the two slower process that analyzes frames with even frame sequence numbers, and another of the two slower processes that analyzes frames with odd frame sequence numbers. In balancing the workload for network testing with multiplexed flows instead of a single flow, however, there is an issue of synchronization between multiple flows.

In a network testing environment, multiple flows can be started at about the same time such that it is possible for the frame sequence numbers to be synchronized between the flows. For example, 64,000 flows are generated at about the same time, such that frames with a particular frame sequence number of 0 are received first by a fast process (e.g. 540), and then frames with a subsequent frame sequence number of 1 are received. If frames with even frame sequence numbers are assigned to an even slower process, and frames with odd frame sequence numbers are assigned to an odd slower process, then the even slower process must process 64,000 frames with the frame sequence number of 0 while the odd slower process idles, and the odd slower process must process 64,000 frames with the frame sequence number of 1 while the even slower process idles.

To balance the workload for network testing with multiplexed flows (e.g. 510), the present technology provides a method of line speed sequence number checking of frames that uses both the frame sequence number and the flow number to assign a frame to a slower process. The method includes, in a first process (e.g. 540), using a lowest order bit of a frame sequence number of a frame (e.g. B0 of 522 of 520) and a lowest order bit of a flow number of the frame (e.g. B0 of 521 of 520) to assign the frame (e.g. 520) to one of two second processes (e.g. 551 and 552) and dispatching at least the frame sequence number (e.g. 522) and the flow number (e.g. 521) for processing by the assigned second process.

The method includes, in the first process (e.g. 540), further flagging as a first sequence error type (i.e. "out of order frame" sequence error) occurrences of assigning consecutively processed frames from a same flow in the multiplexed flows to the same one of two second processes. For a single flow, as described in connection with FIG. 1, the "out of order frame" sequence error can be detected in the first process by storing a lowest order bit of a frame sequence number of a previous frame, and then comparing a lowest order bit of a frame sequence number of a current frame with the stored lowest order bit (e.g. 134). Correspondingly, for multiplexed flows, the "out of order frame" sequence error can be detected in the first process by storing a lowest order bit of a frame sequence number of a previous frame for each flow in the multiplexed flows, and then comparing a lowest order bit of a frame sequence number of a current frame with the stored lowest order bit for each flow in the multiplexed flows.

In one implementation, a frame (e.g. 520) is assigned to one of the two slower processes (e.g. 551 and 552) according to an exclusive-or operation (e.g. 530) of the lowest order bit of the frame sequence number of the frame (e.g. B0 of 522 of 520) and the lowest order bit of the flow number of the frame (e.g. B0 of 521 of 520). Consequently, frames with even sequence numbers from flows with even flow numbers and frames with odd sequence numbers from flows with odd flow numbers are assigned to a slower process (e.g. 551), while frames with even sequence numbers from flows with odd flow numbers and frames with odd sequence numbers from flows with even flow numbers are assigned to another slower process (e.g. 552).

When there are no errors in network traffic, incoming frames to the first process (e.g. 540) from multiplexed flows (e.g. 510) can include flow numbers and frame sequence numbers, for example in the notation of [flow number/sequence number], [1/1] [1/2] [2/1] [1/3] [1/4] [2/2] [1/5] [1/6] [2/3] [1/7] [1/8] [2/4], where the first frame has a frame number of 1 and a frame sequence number of 1, the second frame has frame number of 2 and a frame sequence number 1, etc.

The table below illustrates how the incoming frames are assigned to the slower processes. For example, frames with [flow number/sequence number] of [2/2] [2/4] are assigned to the slower process 551 because their flow number and sequence number are even and even, frames with [flow number/sequence number] of [2/1] [2/3 ] are assigned to the slower process 552 because their flow number and sequence number are even and odd. Distribution of frames as described for multiplexed flows balances the workload of network testing even in the event of synchronization between multiple flows, and thus prevents a burst of frames from different flows from being assigned to one slower process while the other slower process idles. For example, if frames with [flow number/sequence number] of [1/1] and [2/1] are generated at about the same time such that the frame sequence numbers (e.g. 1) are synchronized between the flows (e.g. 1 and 2), the two frames are assigned to two different slower processes.

| Slower process | Criteria for Assigning Frames | [Flow number/ Sequence number] |
|---|---|---|
| 551 | even/even | [2/2] [2/4] |
| 551 | odd/odd | [1/1] [1/3] [1/5] [1/7] |
| 552 | even/odd | [2/1] [2/3] |
| 552 | odd/even | [1/2] [1/4] [1/6] [1/8] |

A "lost frame" sequence error can occur when a frame in a flow in the multiplexed flows is lost. For example, if there are no errors in network traffic for flow number 1, then the slower process 552 receives frames with even sequence numbers of [1/2], [1/4], [1/6 ] and [1/8], where frame sequence numbers of two consecutively processed incoming frames differ by 2. If the frame with [flow number/sequence number] of [1/4] is lost, then the slower process 552 receives frames from flow number 1 with even sequence numbers of [1/2], [1/6] and [1/8], where frame sequence numbers of [1/2] and [1/6] differ by 4, a value other than 2.

A "duplicated frame" sequence error can occur when a frame in a flow in the multiplexed flows is duplicated. For example, if there are no errors in network traffic for flow number 1, then the slower process 552 receives frames with even sequence numbers of [1/2], [1/4], [1/6] and [1/8], where frame sequence numbers of two consecutively processed incoming frames differ by 2. If the frame with [flow number/ sequence number] of [1/4] is duplicated, then the slower process 552 receives frames from flow number 1 with even sequence numbers of [1/2], [1/4], [1/4], [1/6] and [1/8], where frame sequence numbers of [1/6] and [1/6] differ by 0, a value other than 2.

Consequently, both the "lost frame" sequence error and the "duplicated frame" sequence error result in non-consecutive frame sequence numbers in consecutively processed incoming frames to the slower processes.

The method further includes, in the second processes, checking the frame sequence number of an incoming frame of a flow in the multiplexed flows, flagging as a second sequence error type (i.e. "duplicated frame" sequence error or "lost frame" sequence error) non-consecutive frame sequence numbers in consecutively processed incoming frames of the flow, and dispatching the frame for additional downstream processing. For example, in the second processes, consecutively processed incoming frames can be checked to determine if their frame sequence numbers differ by 2, and if not, flag the second sequence error type.

As mentioned above, the technology disclosed may be implemented in a computing system that performs line speed sequence number checking of frames in a single flow or multiplexed flows. The computing system includes one or more processors configured to perform operations implementing methods described herein and any of the features and optional implementations of the methods described.

While examples and implementations of the technology disclosed are detailed above, it is understood that these examples are intended in an illustrative rather than in a limiting sense. Computer-assisted processing is implicated in the described implementations. Accordingly, the technology disclosed may be embodied in methods for line speed sequence number checking of frames, systems including logic and resources to perform line speed sequence number checking of frames, systems that take advantage of computer-assisted line speed sequence number checking of frames, media impressed with logic to perform line speed sequence number checking of frames, data streams impressed with logic to perform line speed sequence number checking of frames, or computer-accessible services that carry out computer-assisted line speed sequence number checking of frames. It is contemplated that modifications and combinations will readily occur to those skilled in the art, which modifications and combinations will be within the spirit of the invention and the scope of the following claims.

The invention claimed is:

1. A method of line speed sequence number checking of frames, the method including:
    in a first process, using a lowest order bit of a frame sequence number of a frame to assign the frame to an odd or even second process and dispatching at least the frame sequence number for processing by the assigned second process;
    in the first process, further flagging as a first sequence error type occurrences of assigning consecutively processed frames to the same odd or even second process;
    in the odd and even second processes, checking the frame sequence number of an incoming frame, flagging as a second sequence error type non-consecutive frame sequence numbers in consecutively processed incoming frames, and dispatching the frame for additional downstream processing;
    in a hierarchy of tiers of processes, wherein tier T in the tiers includes 2^(T-1) processes, Tier 1 includes the first process, and Tier 2 includes the odd and even second processes, using a particular bit of a frame sequence number of an incoming frame to a process in Tier T to assign the incoming frame to one of 2^T processes in Tier (T+1); and
    in the processes in Tier (T+1), checking the frame sequence number of the incoming frame, flagging as a third sequence error type frame sequence numbers of two consecutively processed incoming frames differing by a value other than two (2) to the power of (T-1), and dispatching the frame for additional downstream processing.

2. A method of line speed sequence number checking of frames, the method including:
    in a first process, using a modulo N of a frame sequence number to assign the frame to a process in N processes and dispatching at least the frame sequence number for processing by the process in the N processes;
    in the first process, further flagging as a first sequence error type occurrences of assigning consecutively processed frames to the same process in the N processes; and
    in the N processes, checking the frame sequence number of an incoming frame, flagging as a second sequence error type frame sequence numbers of two consecutively processed incoming frames differing by a value other than N, and dispatching the frame for additional downstream processing,
    wherein N is greater than two (2).

3. A method of line speed sequence number checking of frames from multiplexed flows, the method including:
    in a first process, using a lowest order bit of a frame sequence number of a frame and a lowest order bit of a flow number of the frame to assign the frame to one of two second processes and dispatching at least the frame sequence number and the flow number for processing by the assigned second process;
    in the first process, further flagging as a first sequence error type occurrences of assigning consecutively processed frames from a same flow in-the multiplexed flows to the same one of two second processes; and
    in the second processes, checking the frame sequence number of an incoming frame of a flow in the multiplexed flows, flagging as a second sequence error type non-consecutive frame sequence numbers in consecutively processed incoming frames of the flow, and dispatching the frame for additional downstream processing,
    wherein the multiplexed flows include more than two flows of frames.

4. A computing system that performs line speed sequence number checking of frames, the computing system including memory and one or more processors configured to perform operations including:
    in a first process, using a lowest order bit of a frame sequence number of a frame to assign the frame to an odd or even second process and dispatching at least the frame sequence number for processing by the assigned second process;
    in the first process, further flagging as a first sequence error type occurrences of assigning consecutively processed frames to the same odd or even second process;
    in the odd and even second processes, checking the frame sequence number of an incoming frame, flagging as a second sequence error type non-consecutive frame sequence numbers in consecutively processed incoming frames, and dispatching the frame for additional downstream processing;
    in a hierarchy of tiers of processes, wherein tier T in the tiers includes 2^(T-1) processes, Tier 1 includes the first process, and Tier 2 includes the odd and even second processes, using a particular bit of a frame sequence number of an incoming frame to a process in Tier T to assign the incoming frame to one of 2^processes in Tier (T+1); and
    in the processes in Tier (T+1), checking the frame sequence number of the incoming frame, flagging as a third sequence error type frame sequence numbers of two consecutively processed incoming frames differing by a value other than two (2) to the power of (T-1), and dispatching the frame for additional downstream processing.

5. A computing system that performs line speed sequence number checking of frames, the computing system including memory and one or more processors configured to perform operations including:

in a first process, using a modulo N of a frame sequence number to assign the frame to a process in N processes and dispatching at least the frame sequence number for processing by the process in the N processes;

in the first process, further flagging as a first sequence error type occurrences of assigning consecutively processed frames to the same process in the N processes; and in the N processes, checking the frame sequence number of an incoming frame, flagging as a second sequence error type frame sequence numbers of two consecutively processed incoming frames differing by a value other than N, and dispatching the frame for additional downstream processing, wherein N is greater than two (2).

6. A computing system that performs line speed sequence number checking of frames from multiplexed flows, the computing system including memory and one or more processors configured to perform operations including:

in a first process, using a lowest order bit of a frame sequence number of a frame and a lowest order bit of a flow number of the frame to assign the frame to one of two second processes and dispatching at least the frame sequence number and the flow number for processing by the assigned second process;

in the first process, further flagging as a first sequence error type occurrences of assigning consecutively processed frames from a same flow in the multiplexed flows to the same one of two second processes; and in the second processes, checking the frame sequence number of an incoming frame of a flow in the multiplexed flows, flagging as a second sequence error type non-consecutive frame sequence numbers in consecutively processed incoming frames of the flow, and dispatching the frame for additional downstream processing, wherein the multiplexed flows include more than two flows of frames.

* * * * *